(12) United States Patent
Park et al.

(10) Patent No.: US 10,748,708 B2
(45) Date of Patent: Aug. 18, 2020

(54) MULTILAYER CERAMIC CAPACITOR

(71) Applicant: SAMSUNG ELECTRO-MECHANICS CO., LTD., Suwon-Si, Gyeonggi-Do (KR)

(72) Inventors: Jeong Bong Park, Suwon-Si (KR); Se Hwan Bong, Suwon-Si (KR); Mi Ok Park, Suwon-Si (KR); Kyeong Jun Kim, Suwon-Si (KR); Hang Kyu Cho, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 88 days.

(21) Appl. No.: 16/003,968

(22) Filed: Jun. 8, 2018

(65) Prior Publication Data

US 2019/0157004 A1 May 23, 2019

(30) Foreign Application Priority Data

Nov. 22, 2017 (KR) .................... 10-2017-0156510

(51) Int. Cl.
*H01G 4/012* (2006.01)
*H01G 4/30* (2006.01)
(Continued)

(52) U.S. Cl.
CPC .......... *H01G 4/012* (2013.01); *H01G 4/1227* (2013.01); *H01G 4/232* (2013.01); *H01G 4/248* (2013.01); *H01G 4/30* (2013.01); *H01G 4/12* (2013.01)

(58) Field of Classification Search
CPC ...... H01G 4/012; H01G 4/1227; H01G 4/232; H01G 4/248; H01G 4/30; H01G 4/12;
(Continued)

(56) References Cited

U.S. PATENT DOCUMENTS

| 2014/0083755 A1 | 3/2014 | Lee et al. |
| 2014/0240895 A1* | 8/2014 | Lee ................ H01G 4/12 361/301.4 |

(Continued)

FOREIGN PATENT DOCUMENTS

| JP | 2005-252104 A | 9/2005 |
| KR | 10-2014-0118959 A | 10/2014 |
| KR | 10-2016-0040845 A | 4/2016 |

*Primary Examiner* — Michael P McFadden
(74) *Attorney, Agent, or Firm* — Morgan, Lewis & Bockius LLP (57) ABSTRACT

A multilayer ceramic capacitor includes a body, and first and second external electrodes respectively disposed on opposing surfaces of the body in a longitudinal direction. The body includes a capacitive portion including an internal electrode layer including first and second internal electrodes respectively exposed to the opposing surfaces of the body in the longitudinal direction and a floating electrode layer including a floating electrode, the internal electrode layer and the floating electrode layer being alternately stacked with a first dielectric layer interposed therebetween, a cover part disposed on the capacitive portion and having stacked second dielectric layers, a dummy part disposed below the capacitive portion and including a dummy electrode layer including a dummy electrode and a third dielectric layer, the dummy electrode layer and the third dielectric layer being alternately stacked, and an identification layer disposed below the dummy part and having a color distinguished from the cover part.

17 Claims, 9 Drawing Sheets

(51) Int. Cl.
*H01G 4/232* (2006.01)
*H01G 4/248* (2006.01)
*H01G 4/12* (2006.01)

(58) Field of Classification Search
CPC ........ H01G 2/065; H01G 2/24; H01G 4/0085;
H01G 4/306; H01G 4/33
USPC ...................................................... 361/301.4
See application file for complete search history.

(56) References Cited

U.S. PATENT DOCUMENTS

| | | | |
|---|---|---|---|
| 2015/0016014 A1* | 1/2015 | Park | H01G 2/065 |
| | | | 361/301.4 |
| 2015/0041193 A1* | 2/2015 | Lee | H01G 4/12 |
| | | | 174/258 |
| 2016/0005543 A1* | 1/2016 | Wada | H01G 4/30 |
| | | | 361/301.4 |
| 2016/0049255 A1* | 2/2016 | Sugita | H01G 4/30 |
| | | | 361/301.4 |
| 2016/0099105 A1* | 4/2016 | Lee | H01G 2/065 |
| | | | 174/260 |
| 2016/0111216 A1* | 4/2016 | Lee | H01G 4/30 |
| | | | 361/301.4 |

* cited by examiner

MULTILAYER CERAMIC CAPACITOR

CROSS-REFERENCE TO RELATED APPLICATION

This application claims benefit of priority to Korean Patent Application No. 10-2017-0156510 filed on Nov. 22, 2017 in the Korean Intellectual Property Office, the disclosure of which is incorporated herein by reference in its entirety.

TECHNICAL FIELD

The present disclosure relates to a multilayer ceramic capacitor.

BACKGROUND

A multilayer ceramic capacitor (MLCC), among ceramic electronic components, is small in size, has high capacity, and may be easy to mount.

An MLCC is a chip-type condenser, mounted on the circuit boards of various electronic products, such as display devices, including a liquid crystal display (LCD) or a plasma display panel (PDP), a computer, a personal digital assistant (PDA), and a mobile phone, playing an important role in charging and discharging electricity.

Such an MLCC is required to have sufficient strength to avoid or suppress bending in order to withstand stress generated when being manufactured or mounted.

In order to increase strength to avoid or suppress bending, a method of disposing dummy electrodes on upper and lower sides of a capacitive portion of a body of an MLCC has been developed. Here, however, a thickness of the capacitive portion and a cover part are reduced when the dummy electrodes are disposed on both upper and lower sides.

SUMMARY

An aspect of the present disclosure may provide a multilayer ceramic capacitor having increased strength to avoid or suppress bending by forming a dummy part. Another aspect of the present disclosure is to form an identification layer for identifying a portion where a dummy part is formed, whereby strength to avoid or suppress bending may be ensured although the dummy part is disposed only on a lower side of a body and a capacitive portion and a cover part are ensured to be thick.

According to an aspect of the present disclosure, a multilayer ceramic capacitor may include: a body; and first and second external electrodes respectively disposed on opposing surfaces of the body in a longitudinal direction. The body may include: a capacitive portion including an internal electrode layer including first and second internal electrodes respectively exposed to the opposing surfaces of the body in the longitudinal direction and a floating electrode layer including a floating electrode, the internal electrode layer and the floating electrode layer being alternately stacked with a first dielectric layer interposed therebetween; a cover part disposed on the capacitive portion and having stacked second dielectric layers; a dummy part disposed below the capacitive portion and including a dummy electrode layer including a dummy electrode and a third dielectric layer, the dummy electrode layer and the third dielectric layer being alternately stacked; and an identification layer disposed below the dummy part and having a color distinguished from the cover part.

According to another aspect of the present disclosure, a multilayer ceramic capacitor may include a body and first and second external electrodes respectively disposed on opposing surfaces of the body in a longitudinal direction. The body may include: a capacitive portion including first and second internal electrodes alternately arranged with a first dielectric layer interposed therebetween and respectively exposed to the opposing surfaces of the body in the longitudinal direction; a cover part disposed on the capacitive portion and including stacked second dielectric layers; a dummy part disposed below the capacitive portion and including a dummy electrode layer including a dummy electrode and a third dielectric layer, the dummy electrode layer and the third dielectric layer being alternately stacked; and an identification layer disposed below the dummy part and having a color distinguished from the cover part.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Hereinafter, a multilayer ceramic capacitor (MLCC) according to an aspect of the present disclosure will be described in detail.

An MLCC according to an aspect of the present disclosure includes a body and first and second external electrodes respectively disposed on opposing surfaces of the body in a longitudinal direction, and the body includes: a capacitive portion including an internal electrode layer including first and second internal electrodes respectively exposed to opposing surfaces of the body in the longitudinal direction and a floating electrode layer including a floating electrode, the internal electrode layer and the floating electrode layer being alternately stacked with a first dielectric layer interposed therebetween; a cover part disposed on the capacitive portion and having stacked second dielectric layers; a dummy part disposed below the capacitive portion and including a dummy electrode layer including a dummy electrode and a third dielectric layer, the dummy electrode layer and the third dielectric layer being alternately stacked; and an identification layer disposed below the dummy part and having a color distinguished from the cover part.

Figure 1:
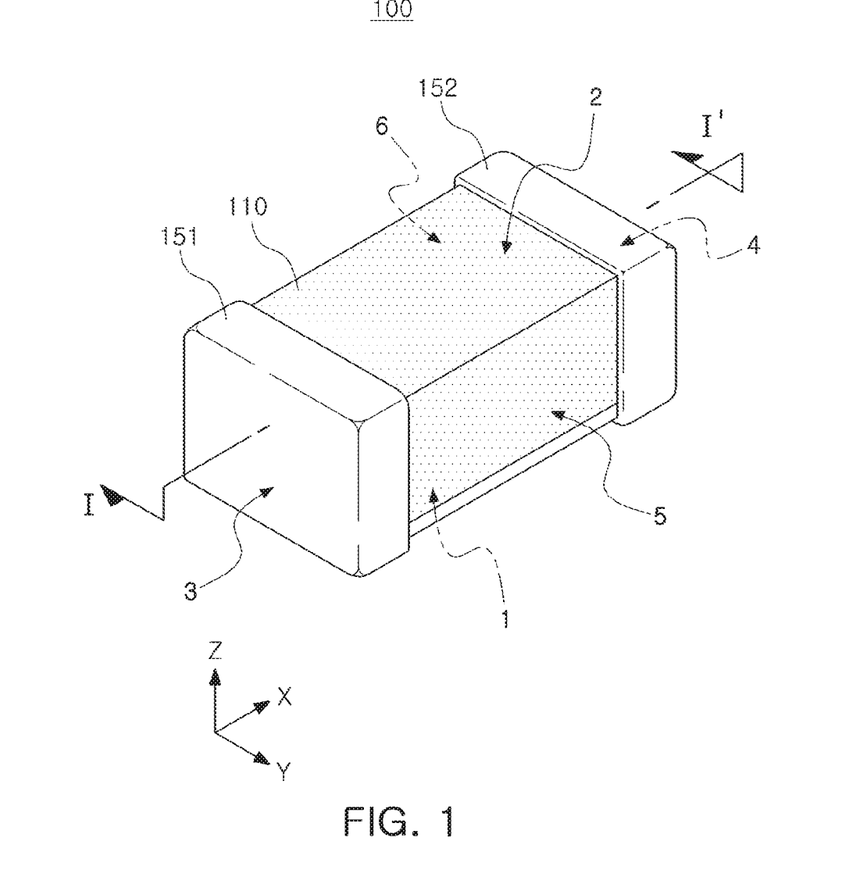
FIG. 1 is a perspective view schematically illustrating a multilayer ceramic capacitor (MLCC) according to an exemplary embodiment in the present disclosure.
Figure 2:
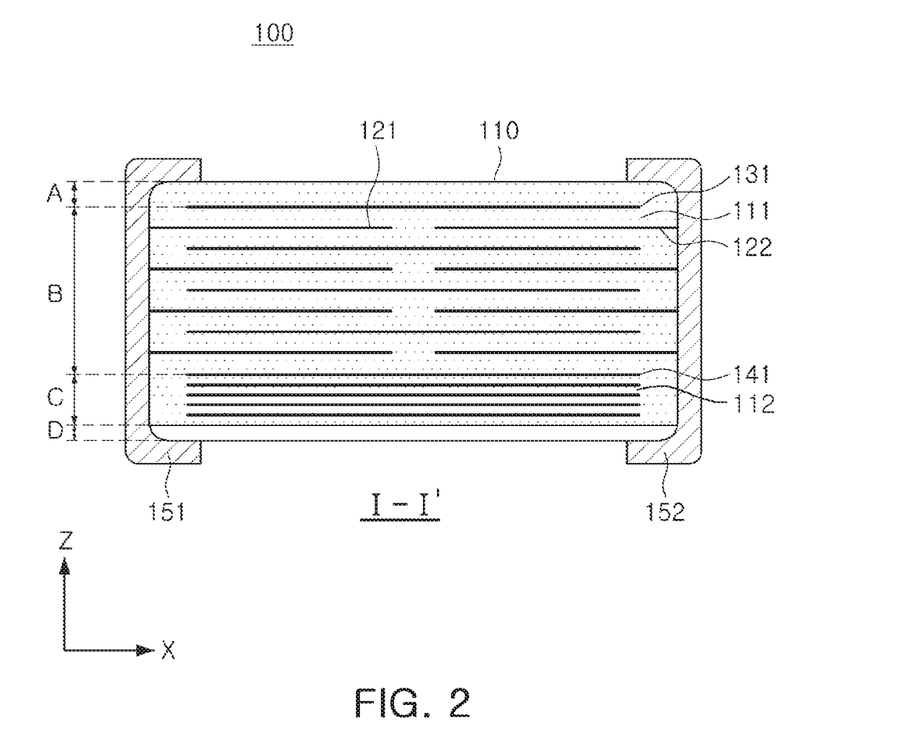
FIG. 2 is a cross-sectional view of the MLCC of FIG. 1, taken along the line I-I'.
Figure 3:
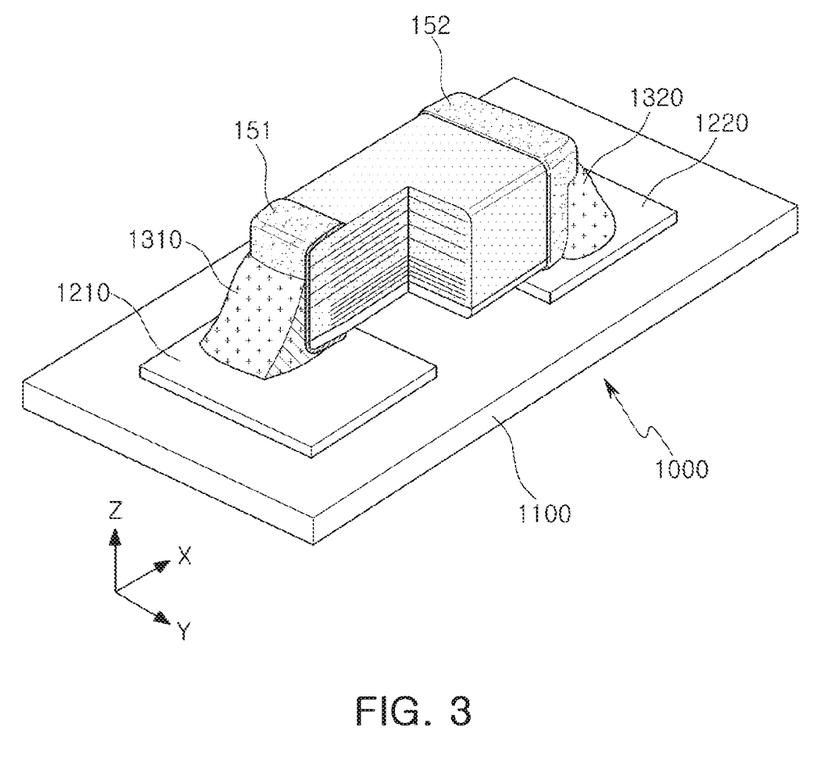
FIG. 3 is a perspective view schematically illustrating a printed circuit board (PCB) on which the MLCC of FIG. 1 is mounted and partially cutaway MLCC of FIG. 1.
Figure 4:
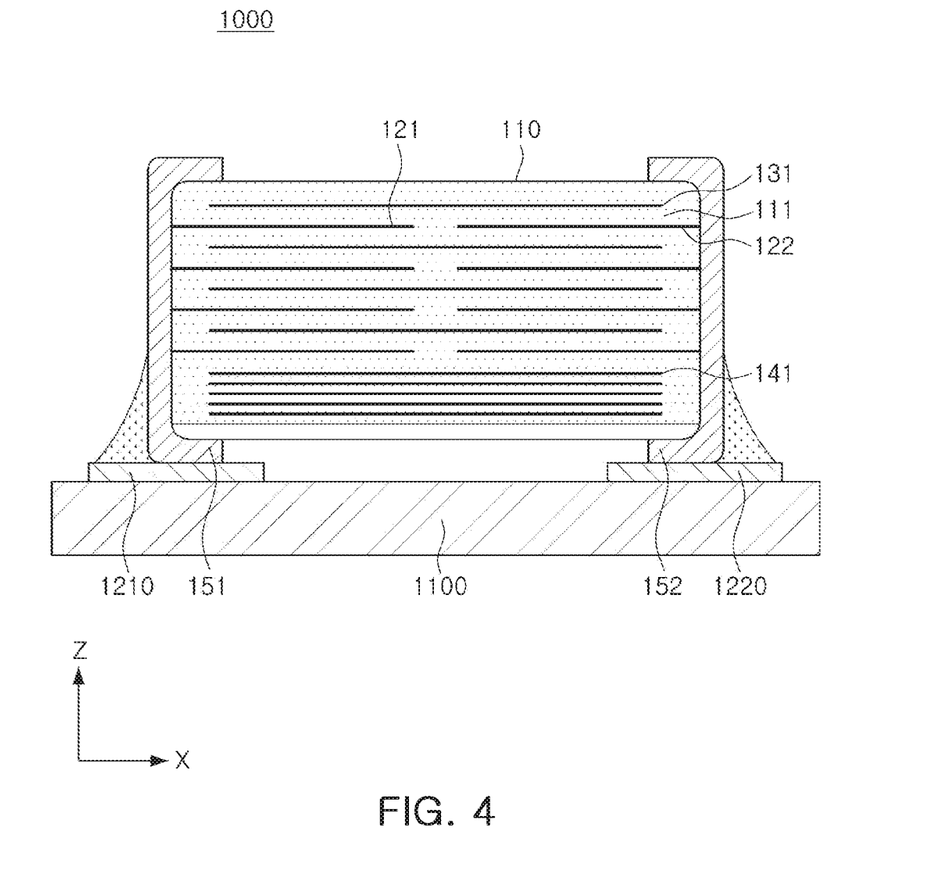
FIG. 4 is a cross-sectional view of a PCB on which the MLCC of FIG. 1 is mounted, taken along the line I-I'.

FIG. 1 is a perspective view schematically illustrating a multilayer ceramic capacitor (MLCC) according to an exemplary embodiment in the present disclosure. FIG. 2 is a cross-sectional view of the MLCC of FIG. 1, taken along the line I-I'. FIG. 3 is a perspective view schematically illustrating a printed circuit board (PCB) on which the MLCC of FIG. 1 is mounted and partially cutaway MLCC of FIG. 1. FIG. 4 is a cross-sectional view of a PCB on which the MLCC of FIG. 1 is mounted, taken along the line I-I'.

Referring to FIGS. 1 through 4, the MLCC 100 according to an exemplary embodiment in the present disclosure includes a body 110 and first and second external electrodes 151 and 152 respectively disposed on both sides of the body 110 in a longitudinal direction.

The first and second external electrodes 151 and 152 are formed of a conductive metal. For example, the first and second external electrodes 151 and 152 may be formed of any one of silver (Ag), lead (Pb), platinum (Pt), nickel (Ni), and copper (Cu), or alloys thereof, and the present disclosure is not limited thereto.

First and second plating layers may be formed on the first and second external electrodes 151 and 152 when necessary.

In an exemplary embodiment in the present disclosure, the body 110 is not particularly limited but has a substantially hexahedral shape.

That is, due to a difference in thickness according to an arrangement of internal electrodes and polishing of corners, the body 110 may have a substantially hexahedral shape, although it is not a perfectly hexahedral shape.

In order to clarify the exemplary embodiment in the present exemplary embodiment, directions of the hexahedron may be defined as follows. Both surfaces of the body 110 opposing each other in the Z direction are defined as first and second surfaces 1 and 2, both surfaces connected to the first and second surfaces 1 and 2 and opposing each other in the X direction are defined as third and fourth surfaces 3 and 4, and both surfaces connected to the first and second surfaces 1 and 2, connected to the third and fourth surfaces 3 and 4 and facing each other in the Y direction are defined as fifth and sixth surfaces 5 and 6. Here, the first surface 1 may be a mounting surface.

The body 110 includes a cover part A, a capacitive portion B, a dummy part C, and an identification layer D.

The cover part A is disposed on an upper surface of the capacitive portion B and a plurality of dielectric layers are in a stacked and sintered state and adjacent dielectric layers is integrated such that boundaries therebetween may not be readily apparent without using a scanning electron microscope (SEM). The cover part A may serve to prevent damage to the first and second internal electrodes 121 and 122 due to physical or chemical stress.

The dielectric layer of the cover part A may be formed of the same material as those of the dielectric layers of the capacitive portion B and the dummy part C, and ceramic powder having high dielectric constant may be used for high capacity. For example, barium titanate ($BaTiO_3$)-based powder or strontium titanate ($SrTiO_3$)-based powder may be used but the present disclosure is not limited thereto.

The capacitive portion B, which contributes to formation of capacitance of the capacitor, includes an internal electrode layer including first and second internal electrodes 121 and 122 respectively exposed to opposing surfaces of the body 110 in the longitudinal direction and a floating electrode layer including a floating electrode 131. The internal electrode layer and the floating electrode layer are alternately stacked with a dielectric layer 111 interposed therebetween.

The internal electrode layer includes the first and second internal electrodes 121 and 122 exposed to opposing surfaces of the body 110 in the longitudinal direction, respectively. The first and second internal electrodes 121 and 122 are arranged on the same plane.

The first and second internal electrodes 121 and 122 may be formed by printing conductive paste containing a conductive metal to have a predetermined thickness on the dielectric layer 111. The first internal electrode 121 may be exposed to the third surface 3 of the body 110 and the second internal electrode 122 may be exposed to the fourth surface 4 of the body 110. The first internal electrode 121 and the second internal electrode 122 may be spaced apart so as to be electrically insulated from each other. That is, the first internal electrode 121 may be exposed to one surface 3, among the both sides of the body 110 in the longitudinal direction (X direction), and the second internal electrode 122 may be exposed to the surface 4 opposing the surface to which the first internal electrode 121 is exposed.

The conductive metal included in the conductive paste for forming the first and second internal electrodes 121 and 122 may be a metal formed of one of Ag, Pb, Pt, Ni, and Cu, or alloys thereof, but the present disclosure is not limited thereto.

The first and second internal electrodes 121 and 122 are electrically connected to the first and second external electrodes 151 and 152 formed on the body, respectively.

The floating electrode layer includes the floating electrode 131 and portions of both ends of the floating electrode 131 may partially overlap the ends of the first and second internal electrodes 121 and 122 spaced apart from each other. The floating electrode 131 may be formed inside the body 110 so as not to be exposed to the outside of the body 110 and may be electrically separated from the first and second external electrodes 151 and 152.

A width of the floating electrode 131 may be equal to a width of the first and second internal electrodes 121 and 122, but the present disclosure is not limited thereto.

Capacitance of the ceramic electronic component (i.e., the MLCC) is adjusted by adjusting the number and shape of the floating electrode 131 and the first and second internal electrodes 121 and 122. Thus, the shape, an overlapping area, and the number of the floating electrode 131 and the first and second internal electrodes 121 and 122 may be variously modified to adjust capacitance.

The floating electrode 131 may be formed by printing conductive paste containing a conductive metal to have a predetermined thickness on a dielectric layer 111, and the conductive metal may be formed of, for example, Ag, Pb, Pt, Ni, and Cu, or alloys thereof, but the present disclosure is not limited thereto.

The dummy part C is disposed below the capacitive portion B and includes a dummy electrode layer including the dummy electrode 141 and the dummy electrode layer is alternately stacked with the dielectric layer 112.

Since the dummy part C includes the dummy electrode 141, it may serve to increase strength to avoid or suppress bending, and since the MLCC of the present disclosure includes the dummy part C, a central portion of the capacitive portion B deviates from a central portion of the body 110.

Although a shape of the dummy electrode 141 is not limited, the dummy electrode 141 may be formed to be symmetrical with respect to the center of the body 110 in the longitudinal direction (X direction) to make horizontal strength to avoid or suppress bending with respect to the center of the body 110 in the longitudinal direction (X direction) uniform. Further, in order to ensure sufficient strength to avoid or suppress bending, a length of the dummy electrode is 80% or greater of a length of the body 110 in the Y direction. Here, however, the first and second external electrodes 151 and 152 should be formed not to be electrically connected by the dummy electrode 141.

Meanwhile, the dummy electrode layer may have the same shape as that of the floating electrode layer or the internal electrode layer. Here, since a process of manufacturing a separate ceramic sheet for forming the dummy part C is not necessary, productivity may be improved.

The number of stacked dummy electrode layers is not limited, and an appropriate number of dummy electrodes may be stacked in consideration of a size, strength to avoid or suppress bending, and use environment of the capacitor.

Meanwhile, if the dielectric layer 111 included in the capacitive portion B is too thin, a short circuit, or the like, may occur. However, since the dummy electrode 141 does not cause such a problem, the dielectric layer 112 included in the dummy part C may be thinner than the dielectric layer 111 included in the capacitive portion B. As a result, a thickness of the dummy part C for obtaining strength to avoid or suppress bending may be reduced, ensuring larger capacity.

The dummy electrode 141 may be formed by printing conductive paste containing a conductive metal to have a predetermined thickness on a dielectric layer 112, and the conductive metal may be formed of, for example, one of Ag, Pb, Pt, Ni, and Cu, or alloys thereof but the present disclosure is not limited thereto.

The identification layer D is disposed below the dummy part C and has a color distinguishable from the dielectric layer of the cover part A. Since the identification layer D has a color distinguishable from the dielectric layer of the cover part A, the identification layer D may facilitate mounting of the MLCC such that the internal electrodes are horizontal to a PCB 1100 and the dummy part C is adjacent to the PCB 1100 as illustrated in FIGS. 3 and 4, and accordingly, the identification layer D may play an important role of increasing strength to avoid or suppress bending. Also, strength to avoid or suppress bending may be ensured and the capacitive portion B and the cover part A may be formed to be thick by simply arranging the dummy part C on the lower side of the body 110.

Figure 8:
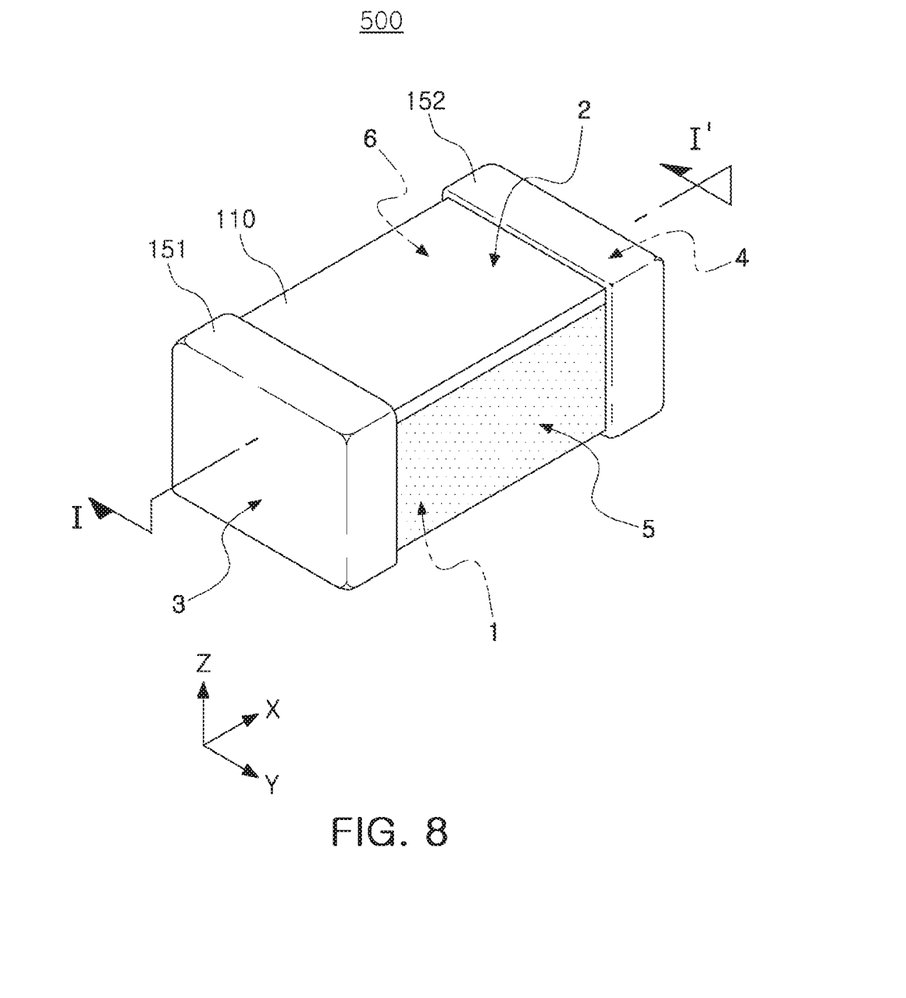
FIG. 8 is a perspective view schematically illustrating a multilayer ceramic capacitor (MLCC) according to an another exemplary embodiment in the present disclosure.
Figure 9:
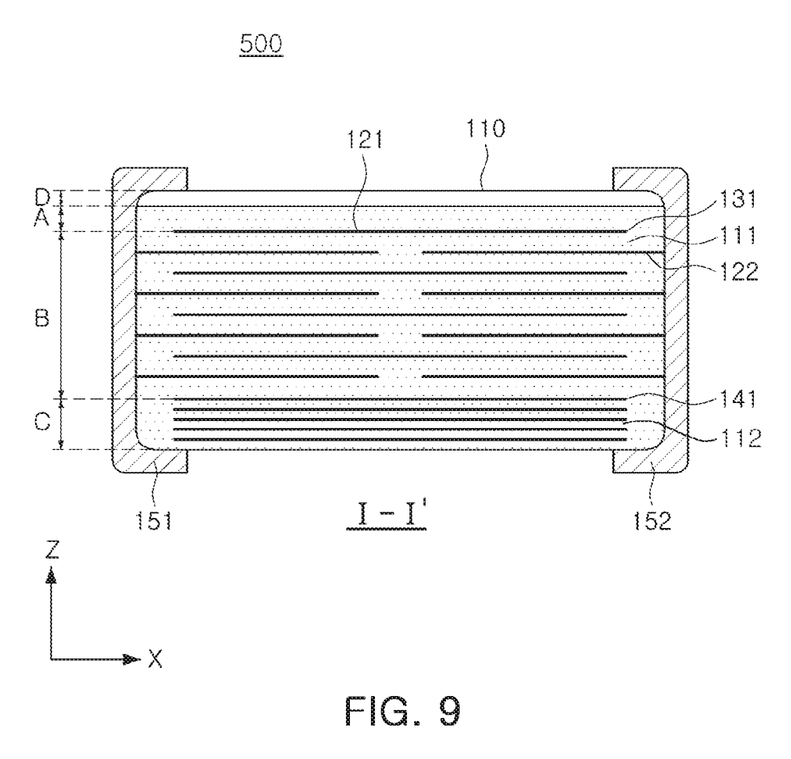
FIG. 9 is a cross-sectional view of an MLCC according to another exemplary embodiment in the present disclosure, taken along line I-I' of FIG. 8.

FIG. 8 is a perspective view schematically illustrating a multilayer ceramic capacitor (MLCC) according to an another exemplary embodiment in the present disclosure; and FIG. 9 is a cross-sectional view of an MLCC according to another exemplary embodiment in the present disclosure, taken along line I-I' of FIG. 8.

The location of the identification layer D is not limited to be below the dummy part C. As illustrated in FIGS. 8 and 9, the identification layer D may be disposed to cover the cover part A, rather than to cover the dummy part C, and thus, the mounting surface may be identified to be a surface opposite to the surface having a color different from the remaining surfaces.

As illustrated in FIGS. 3 and 4, a mounting board 1000 of the MLCC 100 is connected by soldering 1310 and 1320 the first and second external electrodes 151 and 152 of the MLCC to electrode pads 1210 and 1220 formed on the PCB 1100.

The strength to avoid or suppress bending is significantly affected according to mounting surfaces of the MLCC 100.

Figure 5:
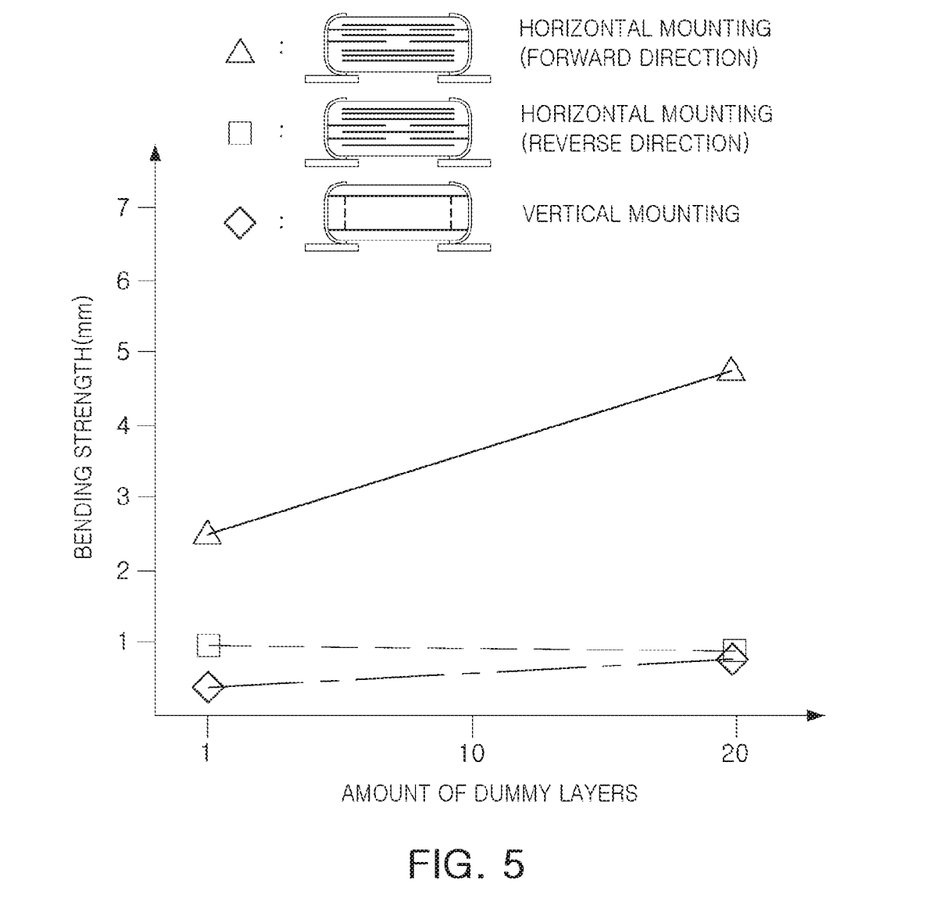
FIG. 5 is a graph illustrating changes in strength to avoid or suppress bending according to mounting types and the amount of dummy electrode layers when a capacitor having a dummy part provided on a lower side of a body is mounted on a PCB.

FIG. 5 is a graph illustrating changes in strength to avoid or suppress bending according to mounting types and the amount of dummy electrode layers when a capacitor in which the dummy part C is positioned on a lower side of a body is mounted on a PCB. In FIG. 5, a case where the MLCC is mounted such that the internal electrodes 121 and 122 are horizontal to the PCB 1100 is denoted as horizontal mounting, a case where the dummy part C is adjacent to the PCB 1100 is denoted as a forward direction and the reverse case thereof is denoted as a reverse direction. A case where the MLCC is mounted such that the internal electrodes 121 and 122 are perpendicular to the PCB 1100 is denoted as vertical mounting.

In the case of vertical mounting, strength to avoid or suppress bending was the lowest and the strength to avoid or suppress bending was not improved although the number of the dummy electrode layers was increased. In the case of horizontal mounting (reverse direction), strength to avoid or suppress bending was not improved although the number of dummy electrode layers was increased. In the case of horizontal mounting (forward direction), strength to avoid or suppress bending was increased as the number of dummy electrode layers was increased.

It is therefore confirmed that mounting the MLCC such that the internal electrodes 121 and 122 are horizontal to the PCB 1100 and the dummy part C is mounted to be adjacent to the PCB 1100 plays an important role in increasing the strength to avoid or suppress bending.

A thickness of the identification layer D after sintering may be 30 μm or greater. If the thickness of the identification layer D is less than 30 μm, it may not be possible to identify the identification layer from the outside. For example, the identification layer D may be formed by laminating at least eight ceramic green sheets of 4 μm or less. An upper limit of the thickness of the identification layer D is not limited but may be less than a thickness of the cover part A.

The identification layer D includes a compound represented by $ABO_3$ as a main component. A includes Ba or Ba and at least one of Ca, Zr, and Sr. B includes Ti or Ti and at least one of Zr and Hf and includes 0.1 to 30 moles of Si and Al with respect to 100 moles of the main component, as an accessory component.

According to an exemplary embodiment of the present disclosure, the identification layer D may include 0 to 2 moles of Mg and 0 to 0.09 moles of Mn with respect to 100 moles of the main component. Here, the additives such as Mg and Mn may have a shrinkage ratio similar to that of the dielectric layers of the cover part A, the capacitive portion B, and the dummy part C to reduce occurrence of cracks or delamination due to a difference in component from the dielectric layers of the cover part A, the capacitive portion B, and the dummy part C.

When a ceramic green sheet formed by including an accessory component including Si and Al in base powder of $BaTiO_3$ and adding a minor amount of Mg or Mn as an additive is sintered at a temperature of 1150□, the sintered ceramic green sheet may have a white color.

In particular, the amount of Mg and Mn may be reduced to manifest white color better. In the identification layer D, the content of Mg and Mn may be included less than 0.001 mol per 100 mols of the main component.

A typical ceramic green sheet which does not have the composition of the accessory component and the additives has a dark brown color, after sintered. After sintered, the white identification layer D may be distinguished by a difference in color from the cover part A, the capacitive portion B, and the dummy part C having the dark brown color. That is, the color of the identification layer D may be brighter than the color of the cover part A, the capacity part B, and the dummy part C.

Figure 6:
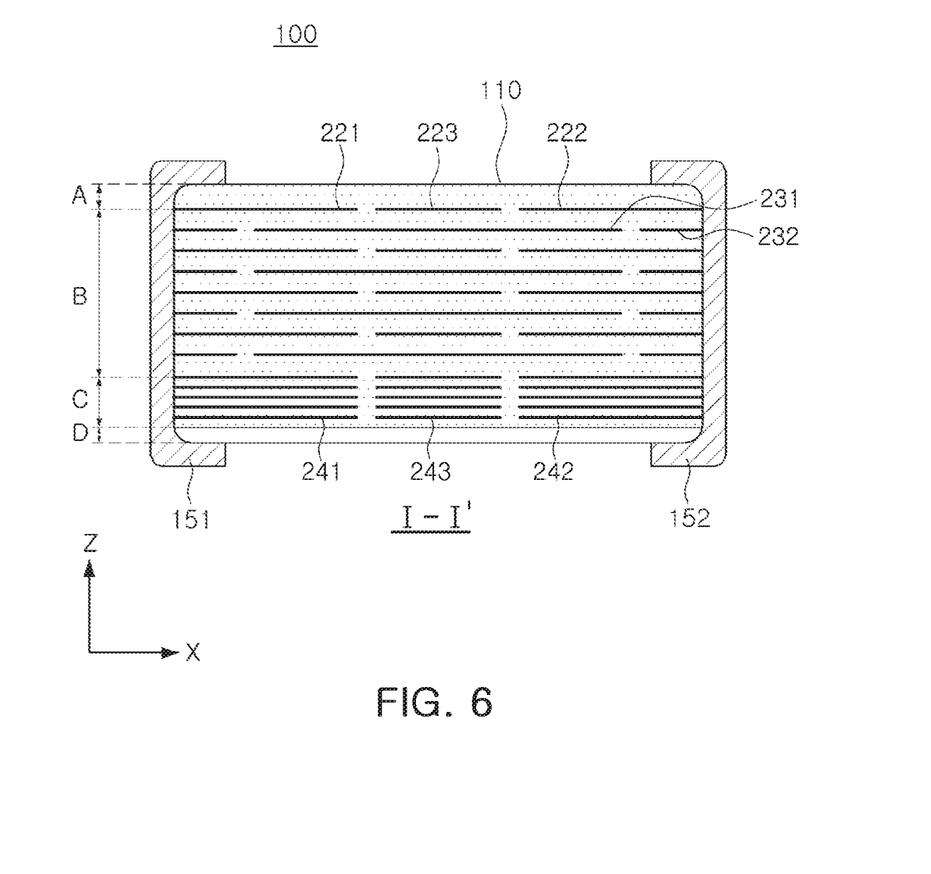
FIG. 6 is a cross-sectional view of an MLCC according to another exemplary embodiment in the present disclosure, taken along line I-I' of FIG. 1.

FIG. 6 is a cross-sectional view of an MLCC 100 according to another exemplary embodiment in the present disclosure, taken along line I-I' of FIG. 1.

Referring to FIG. 6, an internal electrode layer further includes a first electrode pattern 223 between first and second internal electrodes 221 and 222, and the first electrode pattern 223 may be spaced apart from the first and second internal electrodes 221 and 222. Formation of the first electrode pattern 223 in this manner may positively affect enhancement of strength to avoid or suppress bending, and in case where a dummy electrode layer has the same shape as that of the internal electrode layer, productivity may be enhanced and strength to avoid or suppress bending may further be enhanced.

A floating electrode layer may further include second and third electrode patterns 232 spaced apart from a floating electrode 231 and respectively exposed to opposing surfaces of the body in the longitudinal direction. Formation of the second and third electrode patterns 232 in this manner may positively affect enhancement of strength to avoid or suppress bending, and in case where a dummy electrode layer has the same shape as that of the floating electrode layer, productivity may be enhanced and strength to avoid or suppress bending may further be enhanced.

An MLCC according to another aspect of the present disclosure includes a body and first and second external electrodes respectively disposed on opposing surfaces of the body in a longitudinal direction, and the body includes: a capacitive portion including first and second internal electrodes alternately arranged with a first dielectric layer interposed therebetween and respectively exposed to opposing surfaces of the body in the longitudinal direction; a cover part disposed on the capacitive portion and including stacked second dielectric layers; a dummy part disposed below the capacitive portion and including a dummy electrode layer including a dummy electrode and a third dielectric layer, the dummy electrode layer and the third dielectric layer being alternately stacked; and an identification layer disposed below the dummy part and having a color distinguished from the cover part. Hereinafter, a description of the same components as those of the MLCC according to the one aspect of the present disclosure will be omitted.

The MLCC according to another aspect of the present disclosure does not include a floating electrode layer and the first internal electrode and the second internal electrode are not on the same plane but alternately arranged with a dielectric layer interposed therebetween, unlike the MLCC according to one aspect of the present disclosure.

Figure 7:
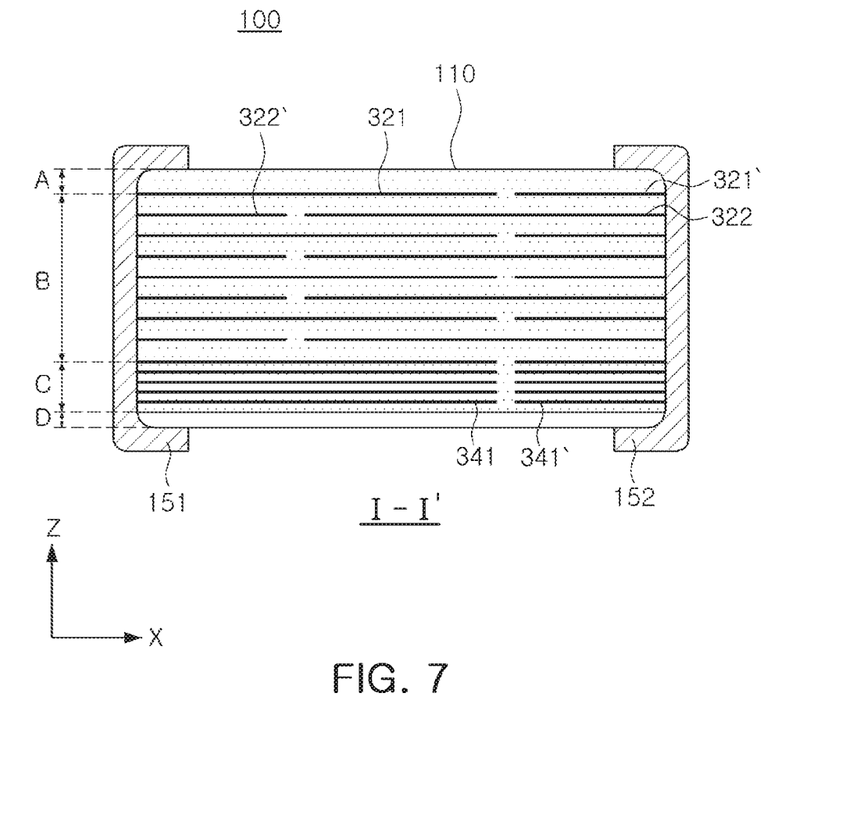
FIG. 7 is a cross-sectional view of an MLCC according to another exemplary embodiment in the present disclosure, taken along line I-I' of FIG. 1.

FIG. 7 is a cross-sectional view of an MLCC 100 according to another exemplary embodiment in the present disclosure, taken along line I-I' of FIG. 1.

Referring to FIG. 7, first and second internal electrodes 321 and 322 may be formed by printing conductive paste containing a conductive metal to have a predetermined thickness on a dielectric layer. The first internal electrode 321 may be exposed to the third surface of the body 110 and the second internal electrode 322 may be exposed to the fourth surface of the body 110. The first internal electrode 321 and the second internal electrode 322 may be spaced apart from each other by a dielectric layer disposed therebetween so as to be electrically insulated from each other.

The first and second internal electrodes 321 and 322 are electrically connected to first and second external electrodes 151 and 152 formed on the body, respectively.

When a voltage is applied to the first and second external electrodes 151 and 152, charges are accumulated between the first and second internal electrodes 321 and 322 facing each other. Here, capacitance of the MLCC 100 is proportional to the area of a region in which the first and second internal electrodes 321 and 322 overlap each other.

Meanwhile, when a layer including the first internal electrode 321 is defined as a first internal electrode layer and a layer including the second internal electrode 322 is defined as a second internal electrode layer, the first internal electrode layer may further include a first electrode pattern 321' exposed to a surface opposing the surface to which the first internal electrode 321 is exposed, and the second internal electrode layer may further include a second electrode pattern 322' exposed to a surface opposing the surface to which the second internal electrode 322 is exposed.

In this manner, formation of the first and second electrode patterns 321' and 322' may positively affect enhancement of strength to avoid or suppress bending.

In addition, productivity may be improved when a dummy electrode layer is formed to have the same shape as that of the first internal electrode layer or the second internal electrode layer. Here, however, if the dummy electrode layer is formed to have the same shape as that of the first internal electrode layer or the second internal electrode layer without the first and second electrode patterns 321' and 322' strength to avoid or suppress bending may become unbalanced. Thus, in case where the dummy electrode layer is formed to have the same shape as that of the first internal electrode layer or the second internal electrode layer by forming the first and second electrode patterns 321' and 322', productivity may be enhanced, strength to avoid or suppress bending may further be enhanced, and strength to avoid or suppress bending may be enhanced uniformly.

As set forth above, according to exemplary embodiments of the present disclosure, the MLCC having increased strength to avoid or suppress bending may be provided. Also, since the identification layer identifying the portion where the dummy part is formed, strength to avoid or suppress bending may be ensured and the capacitive portion and the cover part may be formed to be thick by simply arranging the dummy part on the lower side of the body.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor including a body and first and second external electrodes respectively disposed on opposing surfaces of the body in a longitudinal direction, wherein the body includes:
a capacitive portion including an internal electrode layer including first and second internal electrodes respectively exposed to the opposing surfaces of the body in the longitudinal direction and a floating electrode layer including a floating electrode, wherein the internal electrode layer and the floating electrode layer are alternately stacked with a first dielectric layer interposed therebetween;
a cover part disposed on the capacitive portion and having stacked second dielectric layers;
only one dummy part; and
an identification layer disposed below the dummy part and having a color different from the cover part,
the only one dummy part is disposed between the capacitive portion and the identification layer and includes a third dielectric layer and a dummy electrode layer including a dummy electrode, the dummy electrode layer and the third dielectric layer being alternately stacked, and
each dummy electrode in the only one dummy part is disposed at a center portion of the body in the longitudinal direction so as to be spaced apart from the first and second external electrodes.

2. The multilayer ceramic capacitor of claim 1, wherein the internal electrode layer further includes a first electrode pattern between the first and second internal electrodes, and the first electrode pattern is arranged to be spaced apart from the first and second internal electrodes.

3. The multilayer ceramic capacitor of claim 1, wherein the floating electrode layer further includes second and third electrode patterns spaced apart from the floating electrode and respectively exposed to the opposing surfaces of the body in the longitudinal direction.

4. The multilayer ceramic capacitor of claim 1, wherein the dummy electrode has the same shape as that of the floating electrode layer or the internal electrode layer.

5. The multilayer ceramic capacitor of claim 1, wherein the third dielectric layer included in the dummy part is thinner than the first dielectric layer included in the capacitive portion.

6. The multilayer ceramic capacitor of claim 1, wherein the identification layer has a thickness of 30 µm or greater.

7. The multilayer ceramic capacitor of claim 1, wherein the identification layer is white.

8. The multilayer ceramic capacitor of claim 1, wherein a thickness of the identification layer is less than a thickness of the cover part.

9. The multilayer ceramic capacitor of claim 8, wherein the thickness of the identification layer is 30 µm or greater.

10. A multilayer ceramic capacitor including a body and first and second external electrodes respectively disposed on opposing surfaces of the body in a longitudinal direction, wherein
the body includes:
a capacitive portion including an internal electrode layer including first and second internal electrodes respectively exposed to the opposing surfaces of the body in the longitudinal direction and a floating electrode layer including a floating electrode, wherein the internal electrode layer and the floating electrode layer are alternately stacked with a first dielectric layer interposed therebetween;
a cover part disposed on the capacitive portion and having stacked second dielectric layers;
a dummy part disposed below the capacitive portion and including a third dielectric layer and a dummy electrode layer including a dummy electrode, the dummy electrode layer and the third dielectric layer being alternately stacked; and
an identification layer disposed below the dummy part and having a color different from the cover part, and
the identification layer includes a compound represented by $ABO_3$ as a main component, A includes Ba or Ba and at least one of Ca, Zr, and Sr, and B includes Ti or Ti and at least one of Zr and Hf and includes 0.1 to 30 moles of Si and Al with respect to 100 moles of the main component, as an accessory component.

11. A multilayer ceramic capacitor including a body and first and second external electrodes respectively disposed on opposing surfaces of the body in a longitudinal direction, wherein
the body includes:
a capacitive portion including first and second internal electrodes alternately arranged with a first dielectric layer interposed therebetween and respectively exposed to the opposing surfaces of the body in the longitudinal direction;
a cover part disposed on the capacitive portion and including stacked second dielectric layers;
only one dummy part; and
an identification layer disposed below the dummy part and having a color distinguished from the cover part,
the only one dummy part is disposed between the capacitive portion and the identification layer and includes a third dielectric layer and a dummy electrode layer including a dummy electrode, the dummy electrode layer and the third dielectric layer being alternately stacked,
a thickness of the identification layer is less than a thickness of the cover part, and
the thickness of the identification layer is 30 µm or greater.

12. The multilayer ceramic capacitor of claim 11, wherein when a layer including the first internal electrode is defined as a first internal electrode layer and a layer including the second internal electrode is defined as a second internal electrode layer,
the first internal electrode layer further includes a first electrode pattern exposed to a surface opposing the surface to which the first internal electrode is exposed, and
the second internal electrode layer further includes a second electrode pattern exposed to a surface opposing the surface to which the second internal electrode is exposed.

13. The multilayer ceramic capacitor of claim 12, wherein the dummy electrode layer has the same shape as that of the first internal electrode layer or the second internal electrode layer.

14. The multilayer ceramic capacitor of claim 11, wherein the third dielectric layer included in the dummy part is thinner than the first dielectric layer included in the capacitive portion.

15. The multilayer ceramic capacitor of claim 11, wherein the identification layer has a thickness of 30 µm or greater.

16. The multilayer ceramic capacitor of claim 11, wherein the identification layer is white.

17. The multilayer ceramic capacitor of claim 11, wherein the identification layer includes a compound represented by $ABO_3$ as a main component, A includes Ba or Ba and at least one of Ca, Zr, and Sr, and B includes Ti or Ti and at least one of Zr and Hf and includes 0.1 to 30 moles of Si and Al with respect to 100 moles of the main component, as an accessory component.

* * * * *